UNITED STATES PATENT OFFICE.

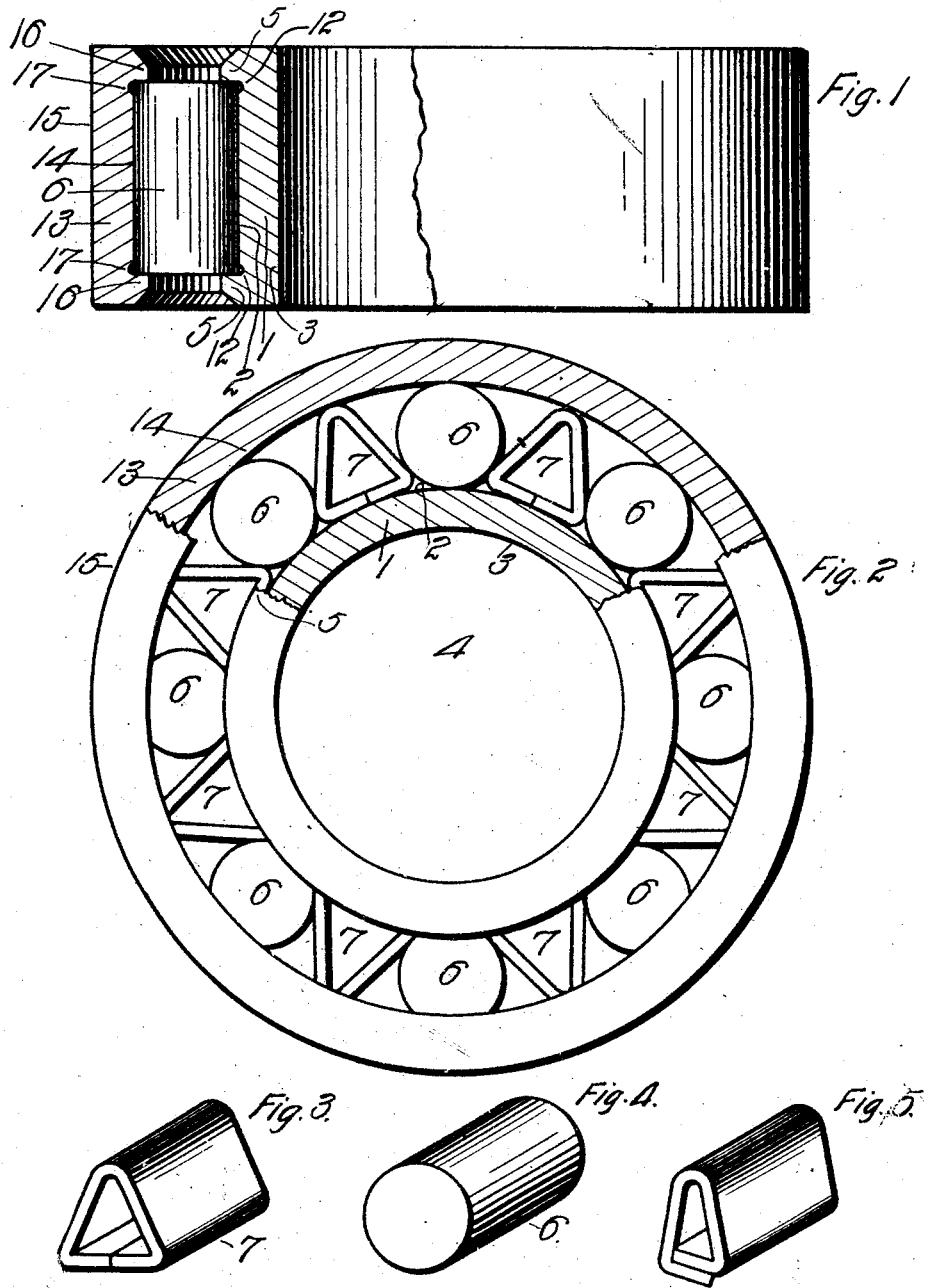

CHRISTIAN F. HEINKEL AND JOHN MUTH, OF CLEVELAND, OHIO.

ROLLER-BEARING.

No. 837,830.   Specification of Letters Patent.   Patented Dec. 4, 1906.

Application filed June 19, 1905. Serial No. 265,949.

*To all whom it may concern:*

Be it known that we, CHRISTIAN F. HEINKEL and JOHN MUTH, citizens of the United States, residing at Cleveland, in the county of Cuyahoga and State of Ohio, have invented a new and useful Improvement in Roller-Bearings, of which the following is a specification.

This invention relates to roller-bearings, or, in other words, to bearings where a number of rollers roll between the rotary and the stationary member of the said bearing.

The object of this invention is a roller-bearing of simple and compact construction, which is illustrated in the accompanying drawings, in which—

Figure 1 is a side view partly broken away to show flanges on sleeve and on shell and to show location of rollers. Fig. 2 is an end view partly broken away to show rollers and spacers. Fig. 3 is a perspective view of a spacer. Fig. 4 is a perspective view of a roller. Fig. 5 is a perspective view of a spacer compressed, so that it may be inserted into bearing.

Similar numerals refer to similar parts throughout the several views.

Sleeve 1 is a hardened annular ring which may be ground on roller-bearing face 2 and shaft-bearing face 3 for the better class of bearings, but need not be ground for the common bearings, and which sleeve 1 is provided with a central bore 4 to receive the shaft, with flanges 5 at each end, which flanges serve to keep the rollers 6 and spacers 7 in place and to take up any end thrust that may come upon the bearing, and with grooves 12 for the purpose of facilitating grinding of face 2, which grooves 12 may be omitted when bearing is not to be ground.

Shell 13 is a hardened annular ring which may be ground on roller-bearing face 14 and outer bearing-face 15 for the better class of bearing, but need not be ground for the common bearing, and which shell 13 is provided with flanges 16 at each end, which flanges serve to keep the rollers 6 and the spacers 7 in place and to take up any end thrust that may come upon the bearing, and with grooves 17 for the purpose of facilitating grinding of face 14, which grooves 17 may be omitted when bearing is not to be ground.

Rollers 6 are hardened straight cylinders and may be ground for the better class of bearing, but need not be ground for the common bearing. End play may be allowed between ends of said rollers and inner faces of said flanges 5 and 16. Said rollers are kept parallel by a spacer 7 between each pair of said rollers.

Spacers 7 are placed between rollers 6 to keep the said rollers in parallelism and so that the said rollers do not rub on each other.

Spacers 7 (shown in Fig. 3) are triangular in shape and hollow and slit longitudinally, so that said spacers may be compressed or closed somewhat in order to insert same into the bearing.

The operation of this bearing is easily understood. The said sleeve 1 or the said shell 13 may be the rotary member, and the said rollers 6 roll between said sleeve 1 and said shell 13, and said rollers 6 are kept in parallelism and spaced equally distant by the said spacers.

Having thus described our invention and without limiting ourselves to the precise construction and arrangement shown, we claim—

1. A roller-bearing having a number of straight rollers and hollow, triangular-shaped and longitudinally-slit spacers between said rollers; substantially as set forth.

2. A roller-bearing having a number of straight rollers; hollow, triangular-shaped and longitudinally-slit spacers between said rollers; a sleeve with flanges at each end; and a shell with flanges at each end; substantially as set forth.

In testimony whereof we have signed our names to this specification in the presence of the two subscribing witnesses.

CHRISTIAN F. HEINKEL.
JOHN MUTH.

Witnesses:
ELMER G. ESSIG,
E. F. KRUEGER.